US012180695B2

(12) United States Patent
Coscarella (10) Patent No.: US 12,180,695 B2
(45) Date of Patent: Dec. 31, 2024

(54) BACKWATER VALVE

(71) Applicant: Gabe Coscarella, Edmonton (CA)

(72) Inventor: Gabe Coscarella, Edmonton (CA)

(*) Notice: Subject to any disclaimer, the term of this patent is extended or adjusted under 35 U.S.C. 154(b) by 0 days.

(21) Appl. No.: 16/995,695

(22) Filed: Aug. 17, 2020

(65) Prior Publication Data

US 2021/0047823 A1 Feb. 18, 2021

Related U.S. Application Data (60) Provisional application No. 62/888,409, filed on Aug. 16, 2019.

(51) Int. Cl.
*E03F 7/04* (2006.01)
*F16K 31/22* (2006.01)
*F16K 1/20* (2006.01)

(52) U.S. Cl.
CPC .......... *E03F 7/04* (2013.01); *F16K 31/22* (2013.01); *F16K 1/2007* (2013.01); *Y10T 137/0491* (2015.04)

(58) Field of Classification Search
CPC ....... E03F 7/04; E03F 5/00; E03F 5/04; E03F 7/00; E03F 7/02; E03F 5/042; F16K 31/22; F16K 15/181; F16K 31/18–34; F16K 15/03–038; F16K 17/00–42; F16K 15/031–207; F16K 31/52475; F16K 31/52441; F16K 1/165; F16K 1/2007; F16K 1/2014; F16K 1/2021; F16K 1/2028; F16K 15/1821; F16K 15/1841; F16K 2200/204;
(Continued)

(56) References Cited

U.S. PATENT DOCUMENTS 130,411 A * 8/1872 Chappell ........... F16K 31/52408
251/259
187,181 A * 2/1877 Schmitz ................. B01D 61/08
210/116
(Continued)

FOREIGN PATENT DOCUMENTS

CA  2022928  2/1992
CA  2114602  8/1995
(Continued)

OTHER PUBLICATIONS

Zurn Z1091 Backwater valve Flapper Type, retrieved from the internet on Jan. 31, 2022 [www.zurn.com] (Year: 2017).*
(Continued)

*Primary Examiner* — Craig J Price
(74) *Attorney, Agent, or Firm* — Nathan V. Woodruff (57) ABSTRACT

A backwater valve has a hollow valve body having an inlet and an outlet, and a valve member pivotally movable about a pivot axis disposed above the inlet. The valve member pivots between an open position in which the valve member is away from the inlet and a closed position in which the valve member closes the inlet. A cam is rotatably mounted above the inlet. The cam has a first rotary position in which the valve member is permitted to move to the open position and a second rotary position in which the cam engages the valve member to secure the valve member in the closed position. With the valve member in the open position, the cam pushes the valve member toward the close position as the cam moves toward the second rotary position.

20 Claims, 9 Drawing Sheets

(58) Field of Classification Search
CPC ...... F16K 33/00; F16K 31/5282; F16K 31/24; F16K 31/521; F16K 31/52; Y10T 137/7898–7903; Y10T 137/7903; Y10T 137/7838; Y10T 137/79; Y10T 137/86984; Y10T 137/5153; Y10T 137/0508; Y10T 137/0486; Y10T 137/0491; Y10T 137/0525
USPC ... 251/298, 304, 305, 251, 259, 260, 92, 98, 251/103, 105, 111, 252; 137/521, 137/527–527.8, 315.39, 446; 169/17, 22
See application file for complete search history.

(56) References Cited

U.S. PATENT DOCUMENTS

| | | | |
|---|---|---|---|
| 194,676 A | 8/1877 | Hansen | |
| 197,838 A | 12/1877 | Downey | |
| 199,696 A | 1/1878 | Dikeman | |
| 207,260 A | 8/1878 | Downey | |
| 217,431 A | 7/1879 | Tilton | |
| 222,389 A | 12/1879 | Earle | |
| 257,449 A * | 5/1882 | Pratt | B60K 15/06 251/266 |
| 271,644 A | 2/1883 | Lowrie | |
| 289,108 A | 11/1883 | Johnson | |
| 353,888 A | 12/1886 | Simpkins | |
| 371,085 A | 10/1887 | McGary | |
| 373,782 A | 11/1887 | McHugh | |
| 384,396 A | 6/1888 | Shepherd | |
| 384,397 A | 6/1888 | Shepherd | |
| 424,580 A | 4/1890 | Shepherd | |
| 463,286 A | 11/1891 | Cone | |
| 500,453 A | 6/1893 | Wright | |
| 566,110 A | 8/1896 | Wrigley | |
| 633,510 A | 9/1899 | Freed | |
| 639,218 A * | 12/1899 | Dempster et al. | F16K 31/52408 251/251 |
| RE11,988 E * | 5/1902 | Gray | 137/543.15 |
| 743,745 A * | 11/1903 | McElroy | B60H 1/00857 251/298 |
| 745,742 A * | 12/1903 | Taube | F16K 15/03 137/527.4 |
| 876,066 A | 1/1908 | Klever | |
| 961,738 A | 6/1910 | Stickel | |
| 993,587 A * | 5/1911 | Dodd et al. | F22D 5/12 137/428 |
| 1,031,567 A | 6/1912 | Miller | |
| 1,104,806 A | 7/1914 | Kahn | |
| 1,113,648 A | 10/1914 | Karlson | |
| 1,183,692 A | 5/1916 | Strout | |
| 1,205,199 A | 11/1916 | Healy | |
| 1,232,180 A * | 7/1917 | Barnes | F16K 15/03 251/303 |
| 1,233,391 A | 7/1917 | Mullane | |
| 1,291,330 A * | 1/1919 | Wilson | F16K 17/00 137/614.19 |
| 1,346,887 A | 7/1920 | Heald | |
| 1,367,911 A * | 2/1921 | Koplin | F16K 15/1821 251/82 |
| 1,411,402 A | 4/1922 | Blackstone | |
| 1,448,898 A | 3/1923 | Zehringer | |
| 1,463,103 A * | 7/1923 | Thorsten | F16K 1/00 137/527.8 |
| 1,464,614 A | 8/1923 | Nacey | |
| 1,552,088 A | 9/1925 | Smith | |
| 1,584,666 A | 5/1926 | Shockley | |
| 1,595,038 A * | 8/1926 | Vencl | F16K 1/24 251/158 |
| 1,606,396 A | 11/1926 | Blom | |
| 1,612,195 A * | 12/1926 | Kirchhan | E03F 5/042 137/448 |
| 1,616,875 A * | 2/1927 | Scheibeler | F16K 31/24 137/448 |
| 1,630,783 A | 5/1927 | Clark | |
| 1,669,119 A * | 5/1928 | Bliss | F16K 1/24 251/158 |
| 1,673,619 A | 6/1928 | Culp | |
| 1,692,127 A | 11/1928 | Keon | |
| 1,699,706 A | 1/1929 | Loepsinger | |
| 1,765,078 A * | 6/1930 | Khun | E03F 7/04 137/445 |
| 1,770,637 A | 7/1930 | Wagner | |
| 1,795,669 A | 3/1931 | Northrop | |
| 1,861,397 A * | 5/1932 | Khun | E03F 7/04 137/448 |
| 1,864,443 A * | 6/1932 | Khun | E03F 7/04 137/445 |
| 1,924,498 A | 8/1933 | House | |
| 1,955,686 A * | 4/1934 | Rowley | A62C 35/02 251/303 |
| 1,969,427 A * | 8/1934 | Sander | F16K 15/03 137/448 |
| 1,991,089 A | 2/1935 | Charpier | |
| 2,001,941 A | 5/1935 | Rowe | |
| 2,013,188 A | 9/1935 | Reinhardt | |
| 2,048,088 A * | 7/1936 | Wagner | F16K 15/03 137/519 |
| 2,112,640 A * | 3/1938 | Wheaton | F16K 15/181 137/599.18 |
| 2,164,232 A * | 6/1939 | Downey | F02M 1/00 251/297 |
| 2,259,128 A | 10/1941 | Egan | |
| 2,290,461 A | 7/1942 | Young | |
| 2,292,509 A * | 8/1942 | Carson | F16K 17/42 137/448 |
| 2,303,808 A | 12/1942 | Wolcott | |
| 2,320,457 A | 6/1943 | Hammell | |
| 2,354,693 A * | 8/1944 | McK Martin | F16K 31/24 137/448 |
| 2,375,806 A * | 5/1945 | McK Martin | F16K 31/24 137/448 |
| 2,431,640 A | 11/1947 | Gordon | |
| 2,504,006 A | 4/1950 | Davis | |
| 2,504,070 A * | 4/1950 | Epstein | F16K 1/2028 251/249.5 |
| 2,578,076 A | 12/1951 | Kirby | |
| 2,628,056 A | 2/1953 | Fuller | |
| 2,638,178 A | 5/1953 | McRill | |
| 2,695,072 A | 11/1954 | Hauslein | |
| 2,786,542 A | 3/1957 | Orfei et al. | |
| 2,846,181 A | 8/1958 | Orelind | |
| 2,877,792 A * | 3/1959 | Tybus | F16K 15/038 137/527 |
| 2,928,410 A * | 3/1960 | Del Vecchio | E03F 7/04 137/115.02 |
| 2,999,509 A | 9/1961 | Hankison et al. | |
| 2,999,666 A | 9/1961 | Sjogren | |
| 3,074,427 A | 1/1963 | Wheeler | |
| 3,075,547 A | 1/1963 | Scaramucci | |
| 3,077,203 A | 2/1963 | Wolsh | |
| 3,078,867 A | 2/1963 | McGillis | |
| 3,135,332 A | 6/1964 | Merdinyan | |
| 3,166,083 A | 1/1965 | Girden | |
| 3,176,707 A | 4/1965 | Wilson | |
| 3,182,951 A | 5/1965 | Spencer | |
| 3,202,165 A | 8/1965 | Yavicoli | |
| 3,244,194 A | 4/1966 | Henry | |
| 3,270,770 A | 9/1966 | Wilson | |
| 3,285,276 A | 11/1966 | Schipper | |
| 3,300,177 A * | 1/1967 | Topham | F16K 1/24 251/177 |
| 3,307,633 A | 3/1967 | Newall | |
| 3,318,568 A * | 5/1967 | Blomstran | F16K 31/52475 251/327 |
| 3,327,732 A | 6/1967 | Deve | |
| 3,334,858 A * | 8/1967 | Hay | F16K 1/2028 251/84 |
| 3,395,721 A | 8/1968 | Shibata | |
| 3,446,237 A | 5/1969 | Haley | |
| 3,448,465 A | 6/1969 | Pierce | |

(56) References Cited

U.S. PATENT DOCUMENTS

| | | | |
|---|---|---|---|
| 3,514,076 A * | 5/1970 | Wheatley | F16K 15/03 |
| | | | 251/298 |
| 3,538,514 A | 11/1970 | Schimert | |
| 3,565,099 A | 2/1971 | Huber | |
| 3,566,500 A | 3/1971 | Simon | |
| 3,626,148 A | 12/1971 | Woytowich | |
| 3,626,521 A | 12/1971 | Delco | |
| 3,685,794 A * | 8/1972 | Henning | F16K 31/52441 |
| | | | 251/303 |
| 3,720,225 A | 3/1973 | Wheatley | |
| 3,726,308 A | 4/1973 | Eberhardt | |
| 3,780,983 A * | 12/1973 | Topham | F16K 1/24 |
| | | | 251/308 |
| 3,781,920 A | 1/1974 | Browne | |
| 3,797,811 A | 3/1974 | Jullien | |
| 3,824,629 A | 7/1974 | Shiley | |
| 3,828,982 A | 8/1974 | Steigerwald | |
| 3,904,171 A * | 9/1975 | Chronister | F16K 31/528 |
| | | | 251/162 |
| 3,933,444 A | 1/1976 | Kilgore | |
| 3,948,282 A | 4/1976 | Yano | |
| 3,959,828 A | 6/1976 | Acevedo | |
| 3,974,654 A | 8/1976 | Mirto | |
| 4,022,421 A | 5/1977 | Carlin | |
| 4,054,153 A | 10/1977 | Guyton | |
| 4,063,570 A | 12/1977 | Mitchell | |
| 4,064,902 A | 12/1977 | Swenson | |
| 4,091,624 A | 5/1978 | Steinke | |
| 4,095,615 A | 6/1978 | Ramsauer | |
| 4,117,860 A * | 10/1978 | Carlin | A62C 33/00 |
| | | | 137/513.5 |
| 4,259,983 A * | 4/1981 | Kessel | E03F 9/00 |
| | | | 137/527.2 |
| 4,266,569 A | 5/1981 | Wilson | |
| 4,311,163 A | 1/1982 | Langevin | |
| 4,314,583 A | 2/1982 | Peterson | |
| 4,324,506 A | 4/1982 | Steinke | |
| 4,391,289 A | 7/1983 | Adams | |
| 4,475,571 A | 10/1984 | Houston | |
| 4,477,051 A | 10/1984 | Ben-Yehuda | |
| 4,499,347 A | 2/1985 | Richards | |
| 4,503,881 A * | 3/1985 | Vecchio | E03F 7/04 |
| | | | 137/425 |
| 4,544,027 A | 10/1985 | Golberg | |
| 4,600,034 A | 7/1986 | Ko | |
| 4,605,031 A | 8/1986 | Grund | |
| 4,634,094 A * | 1/1987 | Geiser | F16K 31/5282 |
| | | | 74/25 |
| 4,777,979 A | 10/1988 | Twerdochlib | |
| 4,787,103 A | 11/1988 | Endo | |
| RE32,870 E | 2/1989 | Houston | |
| 4,844,610 A | 7/1989 | North | |
| 4,852,605 A | 8/1989 | Gouhier | |
| 4,874,012 A | 10/1989 | Velie | |
| 4,891,994 A | 1/1990 | Barba | |
| 4,917,147 A | 4/1990 | Jerkins | |
| 4,921,212 A * | 5/1990 | deQuay | F16K 1/24 |
| | | | 251/163 |
| 4,942,898 A | 7/1990 | Osowski | |
| 4,961,444 A | 10/1990 | Morgan | |
| 4,969,484 A * | 11/1990 | Graves | F16K 15/1821 |
| | | | 137/630.15 |
| 5,020,567 A | 6/1991 | Proulx | |
| 5,031,659 A | 7/1991 | Gonzales | |
| 5,123,444 A | 6/1992 | Persson | |
| 5,156,182 A | 10/1992 | Scaramucci | |
| 5,159,950 A | 11/1992 | Wang | |
| 5,161,566 A | 11/1992 | Scaramucci | |
| 5,165,655 A | 11/1992 | Drexel | |
| 5,209,454 A | 5/1993 | Engdahl | |
| 5,234,018 A | 8/1993 | Grachal | |
| 5,279,320 A * | 1/1994 | Freudendahl | F16K 3/316 |
| | | | 251/368 |
| 5,398,722 A | 4/1995 | Ramsey | |
| 5,398,735 A | 4/1995 | Lagache | |
| 5,406,972 A * | 4/1995 | Coscarella | E03F 7/04 |
| | | | 137/315.08 |
| 5,469,881 A | 11/1995 | Phan | |
| 5,513,395 A | 5/1996 | Chlebek | |
| 5,622,205 A | 4/1997 | Petersen | |
| 5,669,405 A | 9/1997 | Engelmann | |
| 5,755,257 A | 5/1998 | Feucht | |
| 5,779,223 A | 7/1998 | Marbach | |
| 5,785,297 A | 7/1998 | Ha | |
| 5,794,655 A | 8/1998 | Funderburk | |
| 5,819,791 A | 10/1998 | Chronister | |
| 5,826,609 A | 10/1998 | Watts | |
| 5,829,917 A * | 11/1998 | Maudal | E02B 1/003 |
| | | | 405/52 |
| 5,894,858 A | 4/1999 | Schlusselbauer | |
| 5,934,313 A | 8/1999 | Brothers | |
| 5,947,152 A | 9/1999 | Martin | |
| 6,029,684 A | 2/2000 | Watts | |
| 6,029,749 A * | 2/2000 | Reilly | A62C 35/62 |
| | | | 169/17 |
| 6,068,057 A | 5/2000 | Beukema | |
| 6,112,764 A | 9/2000 | Engdahl | |
| 6,125,878 A | 10/2000 | Watts | |
| 6,178,985 B1 | 1/2001 | Robinson | |
| 6,186,164 B1 | 2/2001 | Pfeifer | |
| 6,192,926 B1 | 2/2001 | Bueno Lopez | |
| 6,247,489 B1 | 6/2001 | Maskell et al. | |
| 6,305,411 B1 | 10/2001 | Youssef | |
| 6,314,993 B1 | 11/2001 | Matthews et al. | |
| 6,318,404 B2 | 11/2001 | Coscarella | |
| 6,397,874 B1 | 6/2002 | Featheringill et al. | |
| 6,427,718 B1 * | 8/2002 | Stringam | A01G 25/16 |
| | | | 137/392 |
| 6,446,665 B2 | 9/2002 | Coscarella | |
| 6,499,503 B2 | 12/2002 | Coscarella | |
| 6,648,013 B1 * | 11/2003 | Ray | F16K 15/033 |
| | | | 137/527 |
| 6,666,277 B2 | 12/2003 | Reilly | |
| 6,679,283 B1 | 1/2004 | Coscarella | |
| 6,729,368 B2 | 5/2004 | Nguyen | |
| 6,935,844 B1 | 8/2005 | Dukes | |
| 7,152,615 B1 | 12/2006 | Engdahl | |
| 7,152,622 B2 | 12/2006 | Scaramucci | |
| 7,533,693 B2 * | 5/2009 | Colton, Jr. | F16K 37/0008 |
| | | | 137/553 |
| 7,673,695 B2 * | 3/2010 | Deurloo | F16K 15/181 |
| | | | 169/17 |
| 7,942,606 B2 | 5/2011 | Schafer | |
| 8,123,196 B1 * | 2/2012 | Chernoff | F16K 31/52441 |
| | | | 251/335.1 |
| 8,128,058 B2 * | 3/2012 | Quinn | F16K 1/2028 |
| | | | 251/83 |
| 8,322,365 B2 * | 12/2012 | Wilson | F16K 35/16 |
| | | | 604/9 |
| 8,851,195 B2 * | 10/2014 | Deurloo | A62C 35/68 |
| | | | 169/22 |
| 9,534,693 B2 * | 1/2017 | Qian | F16K 1/2007 |
| 9,560,805 B2 * | 2/2017 | Hull | F16K 15/03 |
| 9,863,134 B2 | 1/2018 | Coscarella | |
| 9,903,106 B2 * | 2/2018 | Coscarella | E03F 7/04 |
| 10,001,218 B2 * | 6/2018 | Fang | F16K 1/2007 |
| 10,072,410 B2 * | 9/2018 | Damgaard Jensen | E03F 7/04 |
| 10,240,333 B2 * | 3/2019 | Hull | F16K 15/04 |
| 10,578,216 B2 * | 3/2020 | Yanagida | F16K 1/2007 |
| 10,589,139 B2 * | 3/2020 | Ringer | F16K 37/005 |
| 10,823,292 B2 * | 11/2020 | Fang | F16K 1/2007 |
| 10,962,062 B2 * | 3/2021 | Jenkins | F16K 31/44 |
| 11,421,788 B2 * | 8/2022 | Fang | F16K 1/2007 |
| 11,435,009 B2 * | 9/2022 | Fang | F16K 31/602 |
| 2001/0023706 A1 | 9/2001 | Coscarella | |
| 2001/0023707 A1 | 9/2001 | Coscarella | |
| 2001/0023708 A1 | 9/2001 | Coscarella | |
| 2001/0035648 A1 | 11/2001 | Coscarella | |
| 2004/0007265 A1 * | 1/2004 | Coscarella | F16K 3/0218 |
| | | | 137/315.41 |
| 2004/0021117 A1 * | 2/2004 | Chapman | F16K 1/24 |
| | | | 251/298 |

(56) References Cited

U.S. PATENT DOCUMENTS

| | | | |
|---|---|---|---|
| 2004/0250863 A1 | 12/2004 | Atkeson | |
| 2006/0081292 A1* | 4/2006 | Sarno | F16K 15/033 137/527 |
| 2006/0162659 A1* | 7/2006 | Schussler | F16K 51/02 118/719 |
| 2008/0030026 A1* | 2/2008 | Cho | F16K 15/181 285/363 |
| 2008/0083464 A1 | 4/2008 | Shimizu | |
| 2008/0128026 A1* | 6/2008 | Ringer | F16K 15/03 137/12 |
| 2008/0128033 A1 | 6/2008 | McGonigle | |
| 2008/0308159 A1* | 12/2008 | Stunkard | F16K 15/03 137/315.33 |
| 2010/0078083 A1 | 4/2010 | Coscarella | |
| 2010/0078084 A1* | 4/2010 | Zuck | F16K 43/008 251/205 |
| 2013/0068972 A1* | 3/2013 | Molavi | F02D 9/14 251/11 |
| 2013/0340488 A1* | 12/2013 | Wohlgemuth | F16K 31/521 251/129.11 |
| 2014/0261789 A1* | 9/2014 | Hull | F16K 15/031 137/527.8 |
| 2019/0040961 A1* | 2/2019 | Fang | F16K 1/24 |
| 2020/0191278 A1* | 6/2020 | Fang | F16K 1/2057 |
| 2024/0093795 A1* | 3/2024 | Prieto | F16K 15/033 |

FOREIGN PATENT DOCUMENTS

| | | |
|---|---|---|
| CA | 2302455 | 9/2001 |
| CA | 2339465 A1 | 9/2002 |
| CA | 2344321 A1 | 10/2002 |
| CA | 2568098 A1 | 4/2008 |
| CA | 2640496 A1 | 4/2010 |
| FR | 2738269 A1 | 3/1997 |
| GB | 191021646 A | 6/1911 |
| GB | 2476707 A | 7/2001 |

OTHER PUBLICATIONS

Product information for Adapt-A-Valve, Mainline Adapt a valve back water valves, 3 pages, dated at least as early as Apr. 12, 2009.

* cited by examiner

FIG. 10

BACKWATER VALVE

FIELD

This relates to backwater valves, and in particular, closures and locks for backwater valves.

BACKGROUND

Backwater valves are often used in buildings, such as residential plumbing systems, to prevent water from flowing back into plumbing system and potentially flooding the building during a backwater event, such as may occur during flooding.

Canadian patent no. 5,406,972 (Coscarella) entitled "Backwater Valve" is an example of a valve used to prevent backwater flow in a plumbing system.

SUMMARY

According to an aspect, there is provided a backwater valve comprising a hollow valve body having an inlet and an outlet, and a valve member pivotally movable about a pivot axis disposed above the inlet. The valve member pivots between an open position in which the valve member is away from the inlet and a closed position in which the valve member closes the inlet. A cam may be rotatably mounted above the inlet, the cam having a first rotary position in which the valve member is permitted to move to the open position and a second rotary position in which the cam engages the valve member to secure the valve member in the closed position. With the valve member in the open position, the cam may push the valve member toward the close position as the cam moves toward the second rotary position.

According to other aspects, the backwater valve may comprise one or more of the following features, along or in combination: the valve member may be biased toward the open position by one or more counterweights, and the one or more counterweights may be removable, and there may be one or more floats that, in the presence of water, rise and engage a valve member actuator, such as the counterweights, to pivot the valve member toward the closed position; the backwater valve may further comprise a water level detector that detects a water level within the hollow valve body, a cam actuator connected to the cam that selectively rotates the cam to the second rotary position, and a controller connected to the water level detector and the cam actuator that comprises instructions to cause the cam actuator to rotate the cam toward the second rotary position in response to a predetermined water level being detected by the water level detector.

According to an aspect, there is provided a method of preventing backwater flow through a pipe, the method comprising the steps of:

connecting an inlet and an outlet of a housing of a backwater valve to the pipe, the backwater valve comprising a valve member pivotally movable about a pivot axis disposed above the inlet, the valve member pivoting between an open position in which the valve member is away from the inlet and a closed position in which the valve member engages the inlet to prevent fluid flow through the inlet, and a cam rotatably mounted above the inlet, the cam having a first rotary position in which the valve member is permitted to move to the open position and a second rotary position in which the cam engages the valve member to secure the valve member in the closed position; and rotating the cam from the first rotary position to the second rotary position to secure the valve member in the closed position and prevent fluid flow between the outlet and the inlet, wherein, with the valve member in the open position, the cam pushes the valve member toward the close position.

According to other aspects, the method may further comprise one or more of the following features, alone or in combination: the method may further comprise the steps of detecting a water level of the backwater flow in the hollow valve body, and upon the water level reaching a predetermined level, activating a motor to rotate the cam from the first rotary position to the second rotary position; the valve member may be biased toward the open position by one or more counterweights; the method may further comprise the step of modifying an operation of the backwater valve from a normally open valve to a normally closed valve by removing the one or more counterweights; the backwater valve may further comprise one or more floats, and the floats may engage the counterweights to move the valve member to the closed position in the presence of water.

According to an aspect, there is provided, in combination, a backwater valve and a backwater valve insert, wherein the backwater valve comprises a hollow valve body having an inlet and an outlet, and the backwater valve insert comprises an insert body having a first end, a second end, and defining a flow path between the first end and the second end, the insert body being sized to be received within the hollow valve body such that the first end is in fluid communication with the inlet of the hollow valve body, and the second end is in fluid communication with the outlet of the hollow valve body. The backwater valve further comprises a valve member carried by the insert body, the valve member being pivotally movable about a pivot axis disposed above the flow path, the valve member pivoting between an open position in which the valve member is away from the inlet and a closed position in which the valve member engages the inlet to prevent fluid flow through the inlet, counterweights that bias the valve member toward the open position, and one or more floats positioned sized to be received within the hollow valve body such that in the presence of water within the hollow valve body, the floats rise and engage the counterweights to move the valve member toward the closed position.

According to other aspects, the combination may further comprise, alone or in combination, one or more of the features described above with respect to the backwater valve; and an inner surface of the hollow valve body of the backwater valve and an outer surface of the insert body that cooperate to define one or more float chambers that receive the one or more floats, the one or more flow channels being in fluid communication with the flow path of the insert body.

According to an aspect, there is provided a backwater valve, comprising a hollow valve body having an inlet and an outlet, a valve member pivotally movable about a pivot axis between an open position in which the valve member is away from the inlet and a closed position in which a sealing surface of the valve member directly engages and covers the inlet to prevent fluid flow through the inlet, the pivot axis being disposed above the inlet, a cam engagement member carried by the valve member above the inlet, and a cam rotatably mounted above the inlet, the cam having a first rotary position in which the valve member is permitted to move to the open position and a second rotary position in which the cam secures the valve member in the closed position, wherein, with the valve member in the open position, rotating the cam from the first rotary position to the second rotary position causes the cam to apply a force to the cam engagement member that pivots the valve member toward the closed position.

According to other aspects, the backwater valve may comprise on or more of the following features, alone or in combination: the valve member may be biased toward the open position by one or more counterweights; the one or more counterweights may be removable; the one or more counterweights may comprise one or more actuators, and the backwater valve may further comprise one or more floats positioned below the one or more actuators such that, as the floats rise, the floats engage and lift the actuators to pivot the valve member toward the closed position; the backwater valve may further comprise a water level detector that detects a water level within the hollow valve body, a motor connected to the cam, and a controller connected to the water level detector and the motor, wherein the controller activates the motor to rotate the cam toward the second rotary position in response to a predetermined water level in the hollow valve body being detected.

According to an aspect, there is provided a method of preventing backwater flow through a pipe, the method comprising the steps of providing a backwater valve in a flow path of the pipe, the backwater valve comprising a hollow valve body having an inlet and an outlet connected in line with the pipe, a valve member pivotally movable about a pivot axis between an open position in which the valve member is away from the inlet and a closed position in which a sealing surface of the valve member directly engages and covers the inlet, the pivot axis being disposed above the inlet, a cam engagement member carried by the valve member above the inlet, and a cam rotatably mounted above the inlet, the cam having a first rotary position in which the valve member is permitted to move to the open position and a second rotary position in which the cam secures the valve member in the closed position, and rotating the cam from the first rotary position to the second rotary position to secure the valve member in the closed position and prevent fluid flow between the outlet and the inlet.

According to other aspects, the method may comprise on or more of the following features, alone or in combination: the method may further comprising the steps of detecting a water level of the backwater flow in the hollow valve body, and upon the water level reaching a predetermined level, activating a motor to rotate the cam from the first rotary position to the second rotary position; the water level may be detected by a water level sensor, and the motor may be activated by a controller in communication with the water level sensor; the valve member may be biased toward the open position by one or more counterweights; the method may comprise the step of modifying an operation of the backwater valve from a normally open valve to a normally closed valve by removing the one or more counterweights; and the counterweights may comprise one or more actuators, and the backwater valve may further comprise one or more floats positioned below the one or more actuators, the floats actuating the actuators to move the valve member to the closed position in the presence of water.

According to an aspect, there is provided a backwater valve insert for retrofitting a backwater valve, the backwater valve comprising a hollow valve body having an inlet and an outlet, the backwater valve insert comprising an inlet extension having a first end, a second end, and a flow path between the first end and the second end, the first end being sized to connect to the inlet of the hollow valve body, a valve member carried by the inlet extension, the valve member being pivotally movable about a pivot axis between an open position in which the valve member is away from the second end of the inlet extension and a closed position in which the valve member directly engages and covers the second end to prevent fluid flow along the flow path, the pivot axis being disposed above the inlet extension, the valve member being biased toward the open position, one or more actuators connected to the valve member, the one or more actuators moving the valve member to the closed position when actuated; and one or more floats positioned adjacent to each of the one or more actuators, each float moving along a float path between a lower position in the absence of water and a raised position in the presence of water, the floats actuating the actuators as the floats move toward the raised position.

According to other aspects the backwater valve insert may comprise one or more of the following features, alone or in combination: the backwater valve insert may further comprise a lock that selectively locks the valve member into the closed position; the lock may comprise a cam that engages a cam engagement member carried by the valve member above the second end of the inlet extension; the backwater valve may comprise a side profile that, when the backwater valve insert is installed in the hollow valve body of the backwater valve, it cooperates with the hollow valve body to define one or more float chambers and one or more flow channels, the one or more float chambers receiving the one or more floats and defining the float path of each float, the one or more flow channels channeling a backflow of water towards the one or more float chambers; the actuators may comprise counterweights that bias the valve member toward the open position; the backwater valve insert of further comprising a lower flange below the inlet extension that extends away from the second end, the lower flange being sized to engage and conform to a bottom surface of the hollow valve body; the lower flange may cover a valve connection on the bottom of the hollow valve body.

According to an aspect, there is provided a method of retrofitting a backwater valve, the backwater valve comprising a hollow valve body having an inlet and an outlet, and an existing valve member that pivots between open and closed positions to control the flow of water through the valve body, the method comprising the steps of removing the existing valve member from the hollow valve body, providing a backwater valve insert comprising an inlet extension having a first end, a second end, and a flow path between the first end and the second end, a valve member carried by the inlet extension, the valve member being pivotally movable about a pivot axis between an open position in which the valve member is away from the second end of the inlet extension and a closed position in which the valve member directly engages and covers the second end to prevent fluid flow along the flow path, the pivot axis being disposed above the inlet extension, the valve member being biased toward the open position, and one or more actuators connected to the valve member, the one or more actuators moving the valve member to the closed position when actuated, inserting the backwater valve insert into the hollow valve body such that the first end connects to the inlet of the hollow valve body, and positioning one or more floats adjacent to each of the one or more actuators, each float being movable along a float path between a lower position in the absence of water and a raised position in the presence of water, the one or more floats actuating the actuators as the one or more floats move to the raised position.

According to other aspects, the method may comprises one or more of the following features, alone or in combination: the backwater valve insert may further comprise a lock that selectively locks the valve member in the closed position; the lock may comprise a cam that engages a cam engagement member carried by the valve member above the second end of the inlet extension; the one or more floats may be positioned in one or more float chambers defined by a side profile of the backwater valve insert in cooperation with the hollow valve body, the one or more float chambers defining the float path; the side profile of the backwater valve insert may cooperate with the hollow valve body to define one or more flow channels that channel a backflow of water toward the one or more float chambers; the actuators may comprise one or more counterweights that bias the valve member toward the open position; the one or more counterweights may be removable; removing the existing valve insert may comprise disconnecting the existing valve from a valve connection on a bottom surface of the hollow valve body; the backwater valve insert may further comprises a lower flange below the inlet extension that extends away from the second end, the lower flange being sized to engage and conform to the bottom surface of the hollow valve body and cover the valve connection; the backwater valve insert may be assembled inside the hollow valve body; and the one or more floats are positioned inside the hollow valve body before the backwater valve insert is inserted inside the hollow valve body.

According to an aspect, there is provided, in combination, a backwater valve and a backwater valve insert, wherein the backwater valve comprises a hollow valve body having an inlet and an outlet, and the backwater valve insert comprises an inlet extension having a first end, a second end, and a flow path between the first end and the second end, the first end being sized to connect to the inlet of the hollow valve body, a valve member carried by the inlet extension, the valve member being pivotally movable about a pivot axis between an open position in which the valve member is away from the second end of the inlet extension and a closed position in which the valve member directly engages and covers the second end to prevent fluid flow along the flow path, the pivot axis being disposed above the inlet extension, the valve member being biased toward the open position, one or more actuators connected to the valve member, the one or more actuators moving the valve member to the closed position when actuated, and one or more floats positioned adjacent to each of the one or more actuators, each float moving along a float path between a lower position in the absence of water and a raised position in the presence of water, the floats actuating the actuators as the floats move toward the raised position.

According to other aspects, the combination may comprise one or more of the following features, alone or in combination: the backwater valve insert may further comprise a lock that selectively locks the valve member into the closed position; the lock may comprise a cam that engages a cam engagement member carried by the valve member above the second end of the inlet extension; a side profile of the backwater valve and the hollow valve body may cooperate with the hollow valve body to define one or more float chambers and one or more flow channels, the one or more float chambers receiving the one or more floats and defining the float path of each float, the one or more flow channels channeling a backflow of water towards the one or more float chambers; the actuators may comprise counterweights that bias the valve member toward the open position; the counterweights may be removable; the hollow valve body may have a bottom surface that comprises a valve connection; and the backwater valve insert may further comprise a lower flange below the inlet extension that extends away from the second end, the lower flange being sized to engage and conform to the bottom surface of the hollow valve body and cover the valve connection.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A backwater valve, generally identified by reference numeral 10, will now be described with reference to FIG. 1 through 10.

Figure 1:
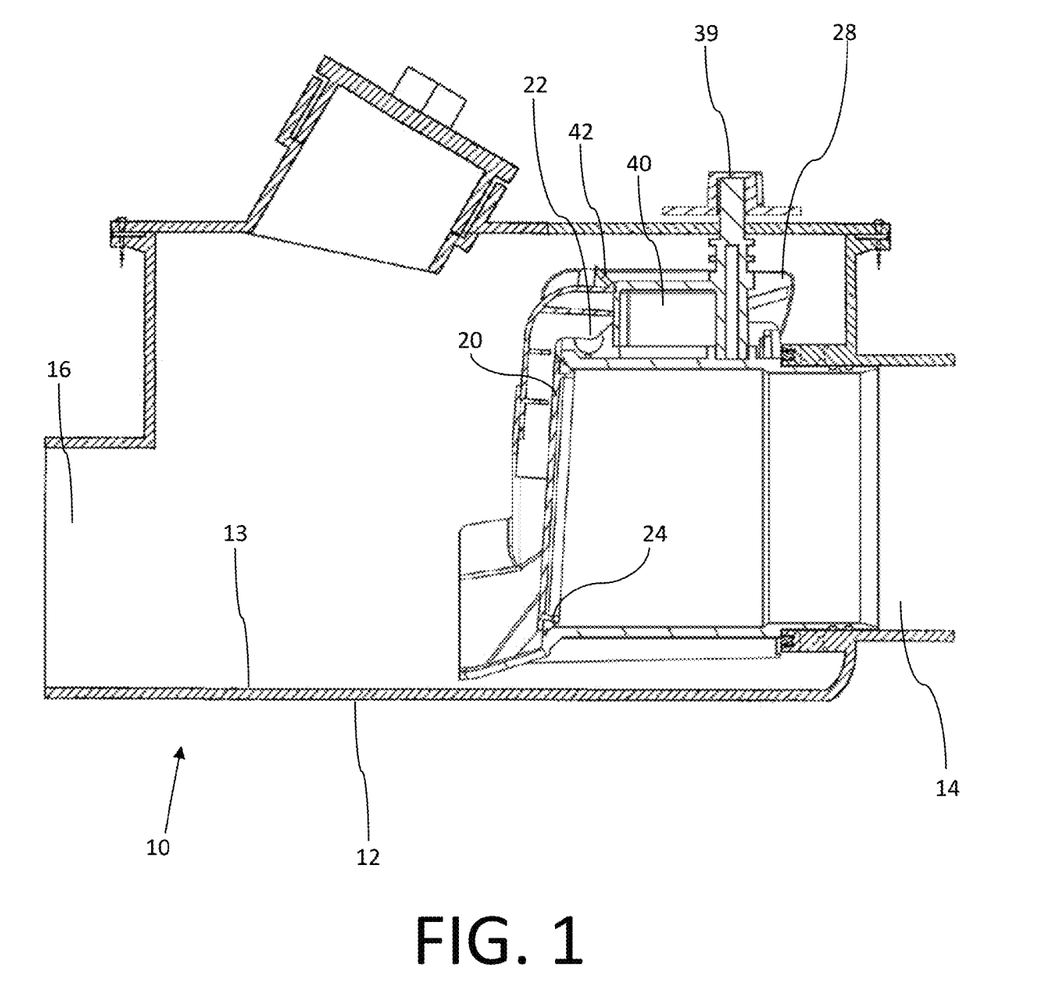
FIG. 1 is a side elevation view in section of a backwater valve with a cam locking device.
Figure 3:
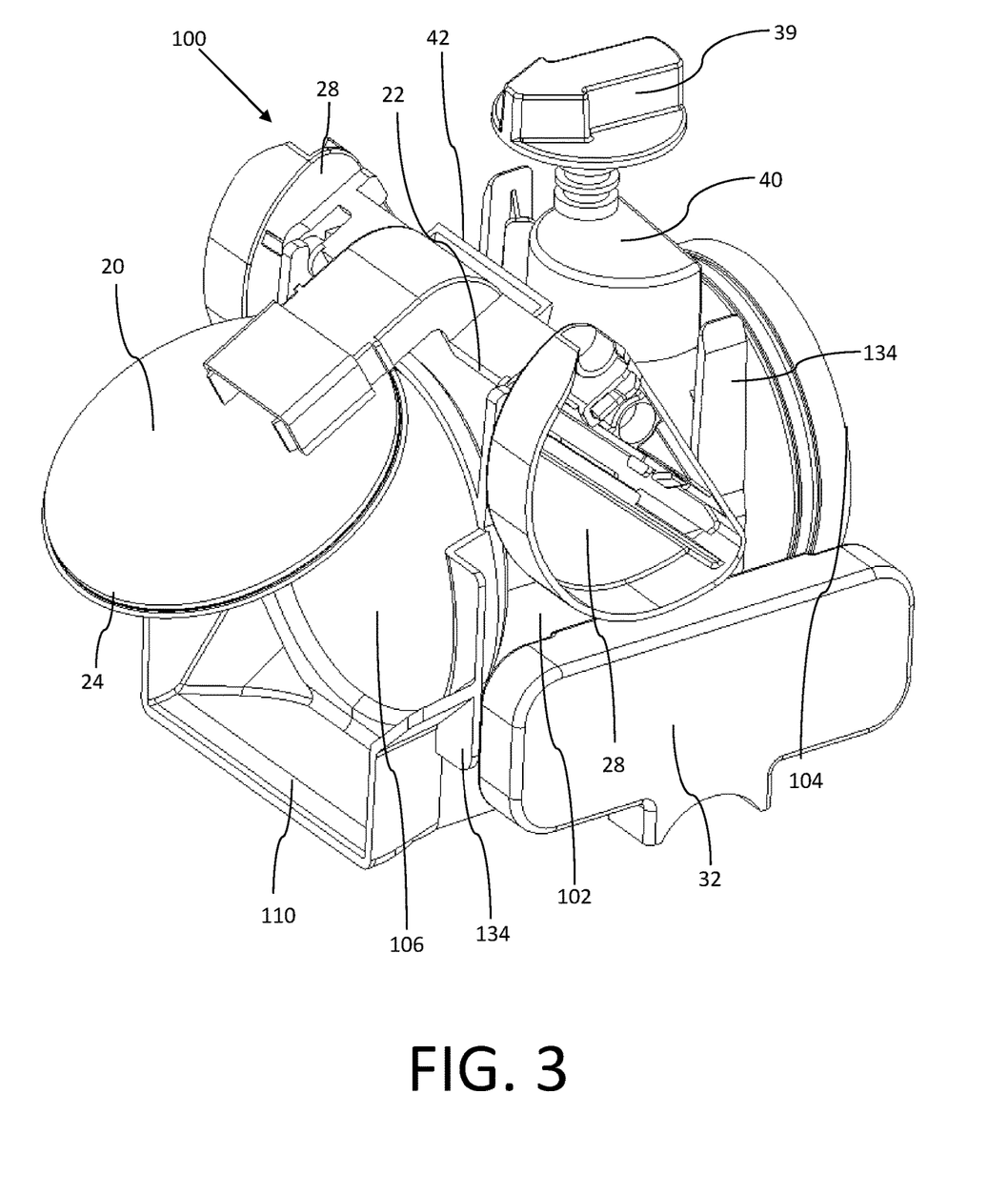
FIG. 3 is a perspective view of a backwater valve insert with the valve in the open position.
Figure 4:
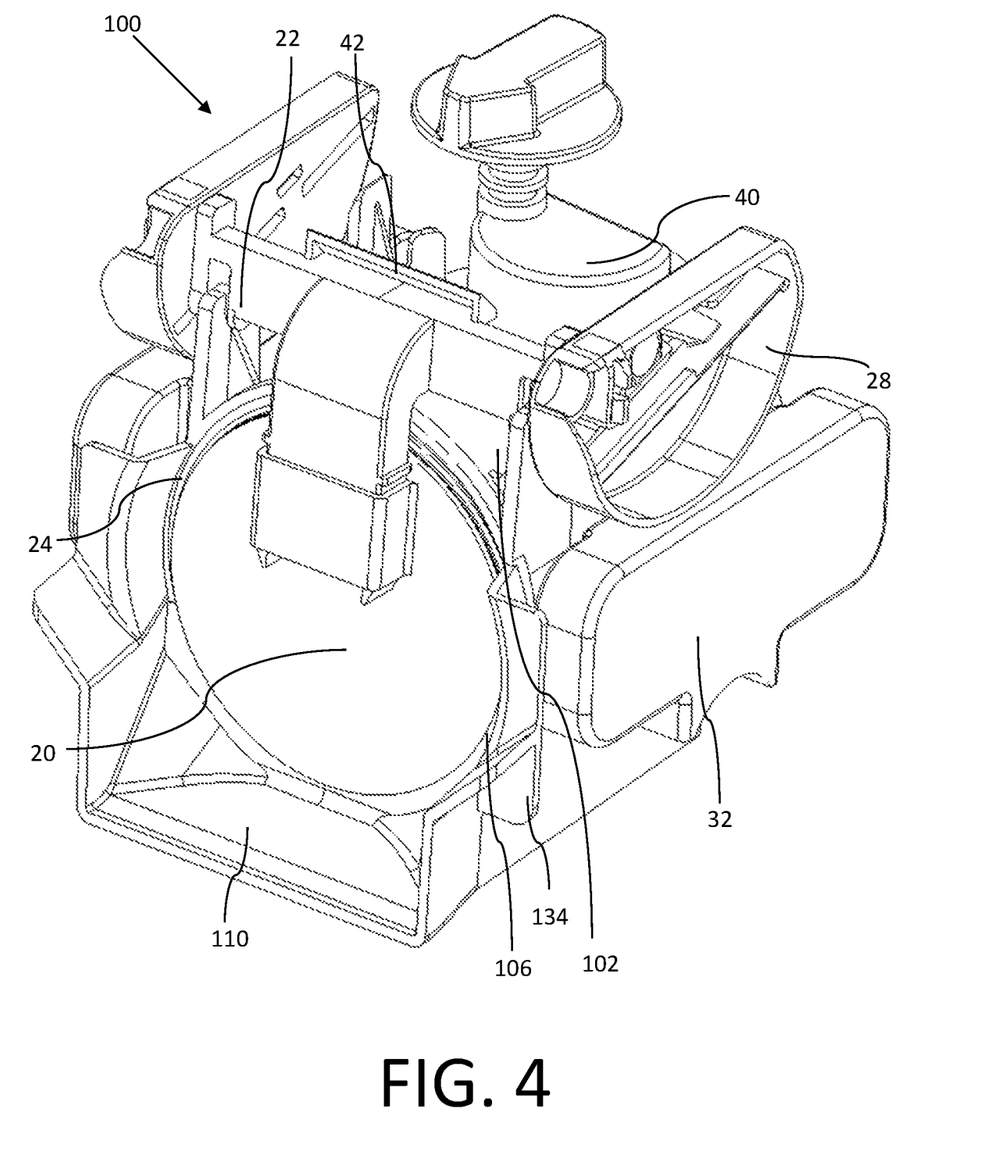
FIG. 4 is a perspective view of a backwater valve insert with the valve in the closed position.

Referring to FIG. 1, backwater valve 10 has a hollow valve body 12 and a valve member 20. Hollow valve body 12 has an inlet 14 and an outlet 16. Valve member 20 is disposed within hollow valve body 12 and is pivotally mounted within hollow valve body 12 about a pivot axis 22. As shown, valve member 20 is pivotally attached to an insert 100 that may be used to facilitate assembly or retrofitting and is discussed below. However, it will be understood that, in other examples, valve member 20 may be pivotally mounted to another element, such as an inner surface of hollow valve body 12. Referring to FIGS. 3 and 4, valve member 20 is pivotally movable between an open position and a closed position. In the closed position, referring to FIG. 4, a sealing surface 24 of valve member 20 engages valve body 12 to prevent fluid flow through inlet 14. In the open position, referring to FIG. 3, valve member 20 is spaced away from inlet 14 to allow fluid flow. Pivot axis 22 is disposed above inlet 14 such that when pivoting from the closed position to the open position, valve member 20 swings up and away from inlet 14.

Valve member 20 may be operable in a normally-open mode, and a normally-closed mode. In the normally-open mode, valve member 20 is biased toward the open position, which may be done by providing one or more counterweights 28. As depicted, counterweights 28 are provided on either side of valve member 20 and cause valve member 20 to pivot toward the open position. Counterweights 28 may be removable or adjustable to allow valve member 20 to be changed from a normally open operation, in which counterweights 28 maintain valve member in a normally open position above inlet 14, to a normally-closed mode of operation covering inlet 14.

In the normally-closed mode, valve member 20 remains closed and opens as water flows from inlet 14 toward outlet 16. Counterweights 28 may still be used to help improve the responsiveness of valve member 20 when water flows from inlet 14 to outlet 16.

In the normally-open mode, valve member 20 and moves to the closed position when actuated. In one example, referring to FIGS. 3 and 4, counterweights 28 may also act as actuators that are actuated by one or more floats 32 to close valve member 20. Floats 32 may be positioned below counterweights 28 and as floats 32 rise, such as in response to a water level rising in hollow valve body 12, floats 32 engage and lift counterweights 28 to pivot valve member 20 toward the closed position. Floats 32 may be unconnected to counterweights 28, or may be connected, either rigidly, with a pivoting connection, or with a gear-type connection. Floats 32 may also engage another actuator other than counterweights 28, such as a separate lever arm, etc. such that floats 32 are able to close valve member 20 as it is lifted. Floats 32 may be enclosed within a float channel 132 that constrict its movement, such as along a vertical path.

Figure 6:
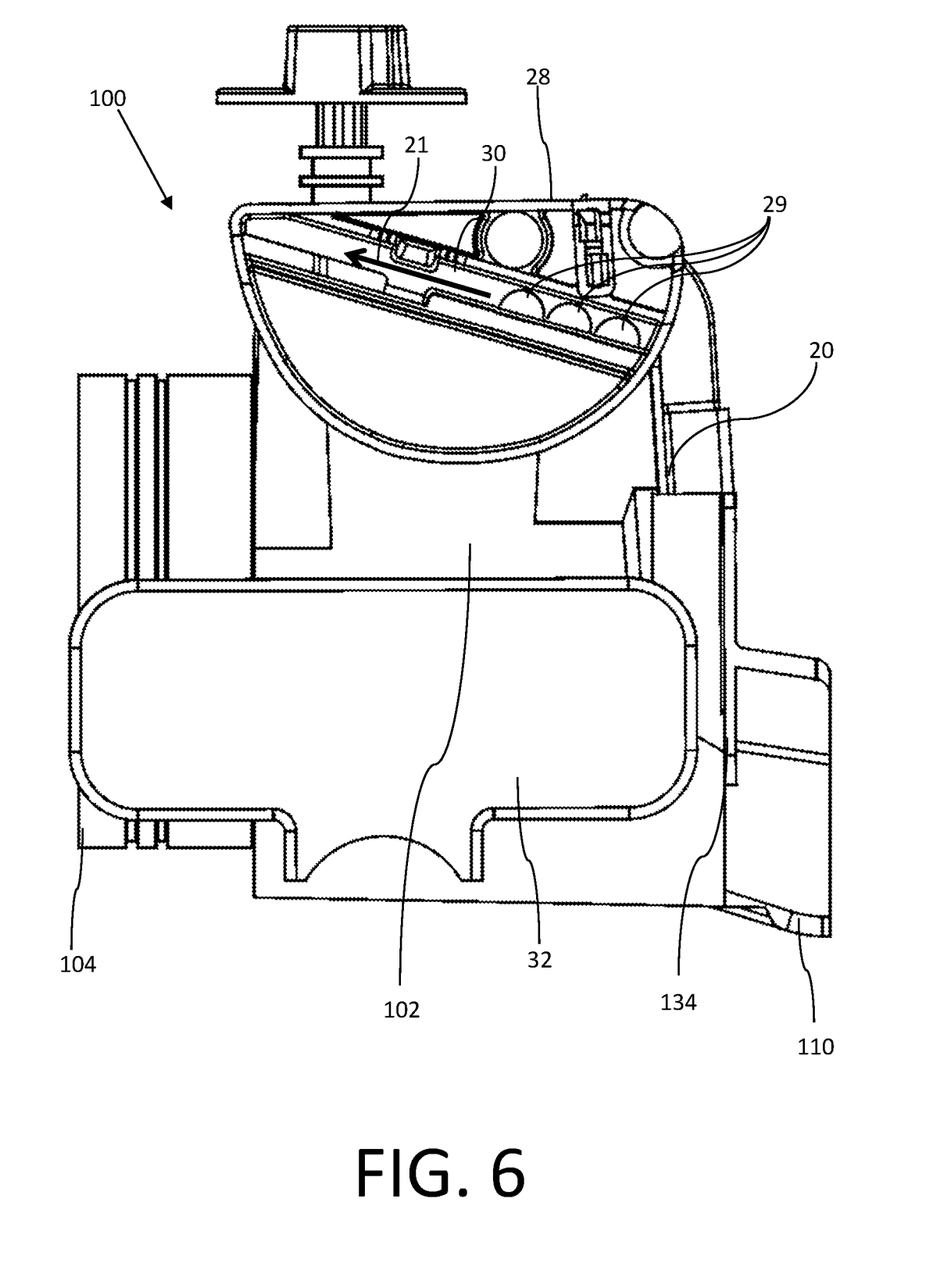
FIG. 6 is a side elevation view of a backwater valve insert with the valve in the closed position.

Referring to FIG. 6, counterweights 28 may be designed with a shifting weight 29, such as ball bearings that roll along a channel 30 as valve member 20 pivots. In this manner, the center of gravity of valve member 20 changes depending on the position. This may be done, for example, to allow valve member 20 to be responsive to a backwater event to close valve member 20, while allowing weights 29 to shift with valve member 20 in the closed position such that additional weight is applied to help keep valve member 20 closed during a backwater event, such as in response to pressure fluctuations, which may result in valve "flutter", or to help close valve member 20 against deposits or debris. In the depicted example, shifting weights 29 are shown within channel 30 in a first position, with valve member 20 closed. As depicted, in the closed position, weights are shifted to a first position that is closer to pivot axis 22 that helps keep valve member 20 closed. When valve member 20 pivots toward the open position, shifting weights 29 travel along channel 30 in the direction indicated by the arrow 21 to a second position away from pivot axis 22 to increase the effect of counterweights 28, such that weights 29 help keep valve member 20 in the open position, while preferably being positioned to ensure valve member 20 is able to quickly close in response to a backwater event.

Figure 5:
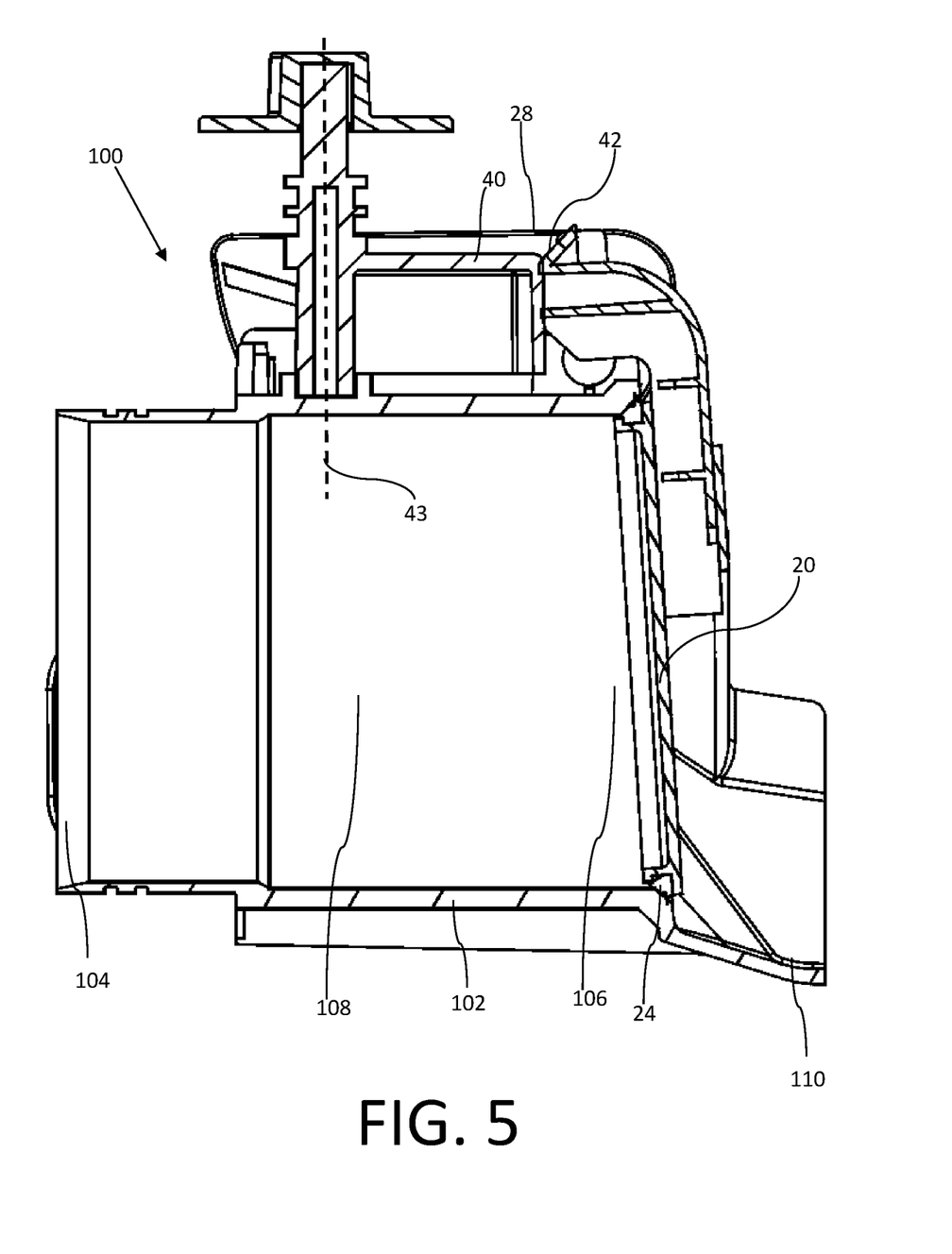
FIG. 5 is a side elevation view in section of a backwater valve insert with the valve the closed position.
Figure 7:
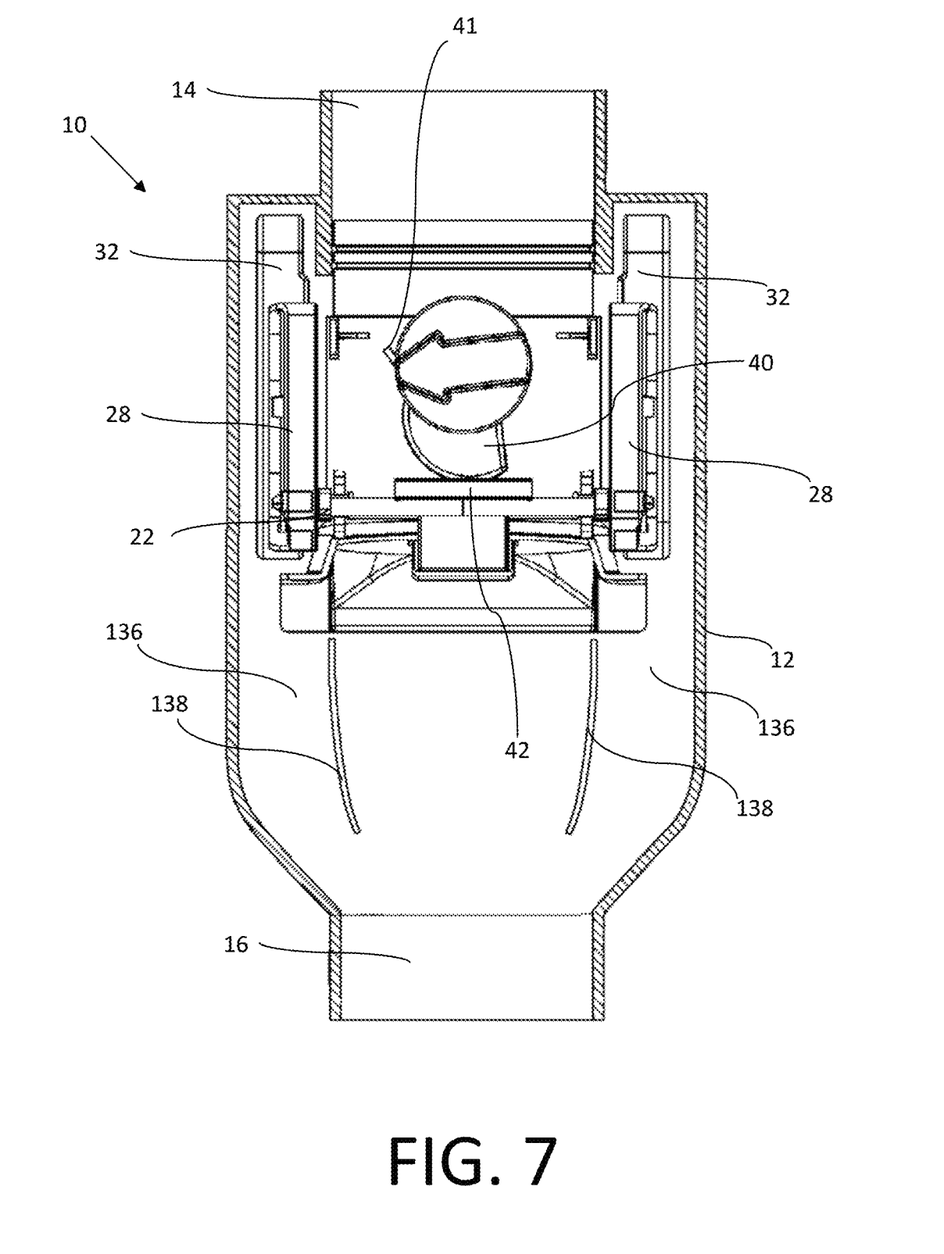
FIG. 7 is a top plan view in partial section of a backwater valve insert in a hollow valve body.

Referring to FIGS. 5, backwater valve 10 has a cam 40 rotatably mounted above inlet 14. Cam 40 may rotate about a vertical axis 43. Referring to FIGS. 3 and 4, cam 40 carries a camming surface with a radius that increases in a circumferential direction such that cam 40 approaches or withdraws from valve member 20 as it rotates. As shown, valve member 20 has an engagement surface 42 that is engaged by cam 40, which may take any suitable form that allows cam 40 to act upon valve member 20. Cam 40 has a first rotary position shown in FIG. 3 in which valve member 20 is permitted to move to the open position and a second rotary position shown in FIG. 4 in which cam 40 secures valve member 20 in the closed position. In the first rotary position, valve member 20 is permitted to move between the open position and the closed position, such as in response to a water level raising floats 32. In the second rotary position, cam 40 is engaged with cam engagement member 42, which causes valve member 20 to be secured in the closed position. When valve member 20 is in the open position, rotating cam 40 from the first rotary position to the second rotary position may cause cam 40 to apply a force to cam engagement member 42 that pivots valve member 20 toward the closed position. Referring to FIG. 7, cam 40 may also be used to apply a jolting or jarring force using a jarring surface 41 carried by cam 40, which may be reached by rotating cam 40 in an opposite direction of the second rotational position relative to the first rotational position. When cam 40 is suitably rotated, valve jarring tool 41 may interact with valve member 20 to quickly close valve member 20 to apply a jolting or jarring force to displace any blockages, such as solid material or build-up, that may be prevent valve member 20 from closing properly. Cam 40 may be used as a locking device. If used as a locking device, cam 40 may not have a camming surface, in which case it would only be able to close and lock valve member 20 when in the closed position. Other considerations discussed herein with respect to cam 40 may apply to a locking device, as will be understood by those skilled in the art.

As shown, cam 40 is provided with an indicator 39, such as an arrow as depicted, that provides a visual indication of whether cam 40 is open or closed. Indicator 39 may also provide a surface to be gripped by a user to manipulate cam 40 between the open and closed position, if required. If it is designed to be gripped by a user, indicator 39 is preferably accessible from outside valve body 12. If inside valve body 12, the top of valve body 12 may be transparent to allow a user to observe indicator 39 without opening valve body 12.

In some circumstances, cam 40 may be biased open or closed by a spring, with suitable compensating design features being provided to the rest of backwater valve 10, such as counterweights 28, valve member 20, etc.

Figure 2:
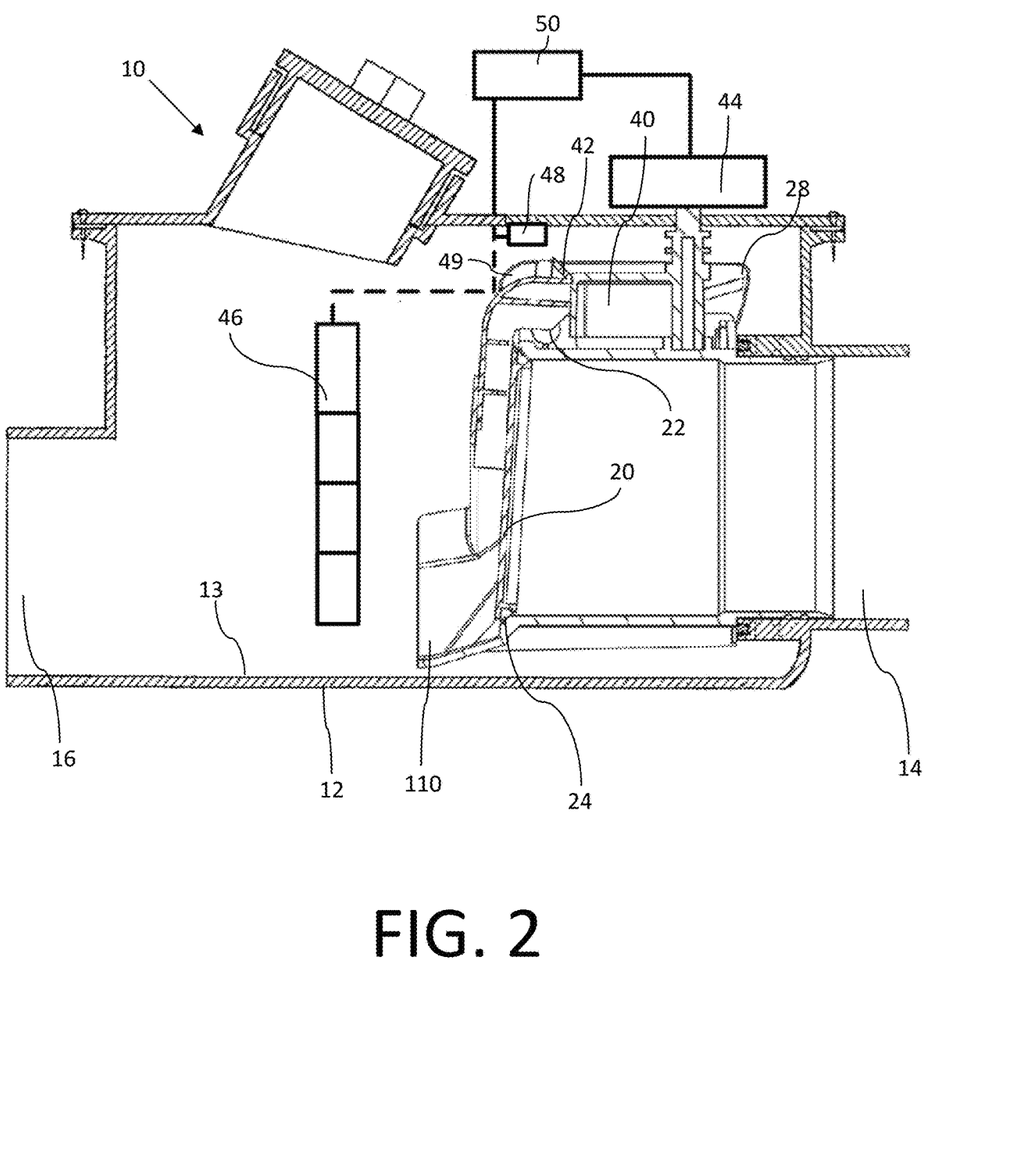
FIG. 2 is a side elevation view in section of a backwater valve with a control system for the cam locking device shown in FIG. 1.

Referring to FIG. 2, backwater valve 10 may be equipped with a motor 44 connected to cam 40, a water level detector 46 that detects a water level with hollow valve body 12, and a controller 50 that is connected to motor 44 and water level detector 46. Water level detector 46 may detect a single water level that indicates a backwater event, or a series of levels, such as a low water level, a high water level, an emergency water level, or any suitable levels. There may also be an additional level sensor (not shown) in communication with the flow path upstream of valve member 20, which may be used to indicate whether there is an increase in the water level upstream of backwater valve 10. Alternatively, or in addition, backwater valve 10 may be provided with a sensor 48 that indicates whether valve member 20 is in the open or the closed position. This may be, for example, a magnetic reed switch or other proximity sensor mounted toward the top of valve body 12 that detects when valve member is open or closed. As shown, sensor 48 interacts with magnet 49 carried by counterweight 28 to determine the position of valve member 20. Another type of sensor may be used that shows intermediate positions as well, if desired. Controller 50 may be configured to activate motor 44 to control the position of cam 40 between the first and second rotary positions in response to a detected water level and/or a detected valve position. For example, controller 50 may be programmed to actuate cam 40 to close valve member 20 if a predetermined water level is detected. Valve sensor 48 may be used to confirm that valve member 20 has closed when a predetermined water level is reached, which may be the same or different than the water level used to closed valve member 20. In this manner, valve sensor 48 may be used to determine if there is a blockage or other failure of valve member 20 that prevents its closure. Controller 50 may be provided with a communication module (not shown), such as a wired or wireless communication link, that sends information or alarms to a user, such as to a computer device, a visual alarm, and/or an auditory alarm (not shown). Controller 50, sensors 46 and 48, and other components may be implemented using known components, such as a typical servo motor, float switch, magnetic reed switch, microcontroller, etc. as will be understood by those skilled in the art. Controller 50 may also be a switch or mechanical actuator that moves cam 40 to the second, closed position, or to the first, open position, depending on the manner in which the water level is changing. There may also be separate controllers 50 for separate functions, or a single controller 50 that performs each function. Additionally, controller 50 may be programmed to receive instructions from a remote device, such as a smart phone with an app that also receives notifications or status updates from one or more of: the sensors, the motor, the controller, etc. For example, such an arrangement could allow a user to intentionally close and lock valve member 20 pre-emptively, such as when leaving on vacation or at other times when additional security is desired. If an upstream water level sensor is used, this may provide additional information to a user, such as if valve member 20 is closed by cam 40 but the water level upstream of backwater valve 10 is increasing. This may allow the user to decide whether to release valve member 20 to allow water to flow, or may automatically trigger valve member 20 to open without any input from the user, depending on the readings from the water level sensors on either side of valve member 20.

A method for of preventing backwater flow through a pipe connected to inlet 14 will now be described. Referring to FIG. 1, backwater valve 10, as described above, is provided in a flow path of the pipe with hollow valve body 12 in line with the pipe such that, under normal operation of the pipe, water will flow into inlet 14 of hollow valve body and out of outlet 16. Referring to FIGS. 3 and 4, in the event of a backflow of water, in which fluid flows into outlet 16, valve member 20 moves to the closed position (if in the normally-open mode of operation) or remain in the closed position (if in the normally-closed mode of operation) to prevent water flow from outlet 16 to inlet 14. This may be accomplished by actuating valve member 20 using floats 32 to apply a force to counterweights 28, by rotating cam 40 from the first rotary position to the second rotary position, or both by actuating valve member 20 and rotating cam 40. Cam 40 may be used to close valve member 20, or to secure valve member 20 in the closed position. In this manner, valve member 20 may be used to prevent fluid flow between outlet 16 and inlet 14. Referring to FIG. 2, the water level in hollow valve body 12 may be detected which may be used to actuate and, upon detecting a water level at a predetermined level in hollow valve body 12, which may also include a measurement of the rate of change of the water level, activating a motor to rotate cam 40 from the first rotary position to the second rotary position. The water level or a predetermined water level, may be communicated to controller 50 that controls and activates motor in response to detecting the predetermined water level. The position of valve member 20 may also be communicated to controller 50 and/or a user using a position sensor 48. This may be used to warn a user that a backwater event has occurred, or that service is required, such as if valve member 20 remains in the open or closed position despite a sensed water position that would require otherwise.

Referring to FIGS. 3 and 4, valve member 20 may be biased toward the open position by one or more counterweights 28, and the operation of backwater valve 10 may be changed from a normally open valve to a normally closed valve by removing the one or more counterweights 28. Counterweights 28 may also be used as actuators and backwater valve 10 may also have one or more floats 32 positioned adjacent to the one or more counterweights 28. In the presence of water, such as during a backwater event, counterweights 28 may be actuated by the floats 32 to move valve member 20 from the open position to the closed position. Valve member 20 may be moved toward the closed position by cam 40 engaging cam engagement member 42 as cam 40 is rotated to the second rotary position, or valve member 20 may be moved toward the closed position by floats 32 actuating counterweights 28. Valve member 20 may then be secured into the closed position by rotating cam 40 to the second rotary position.

Figure 8:
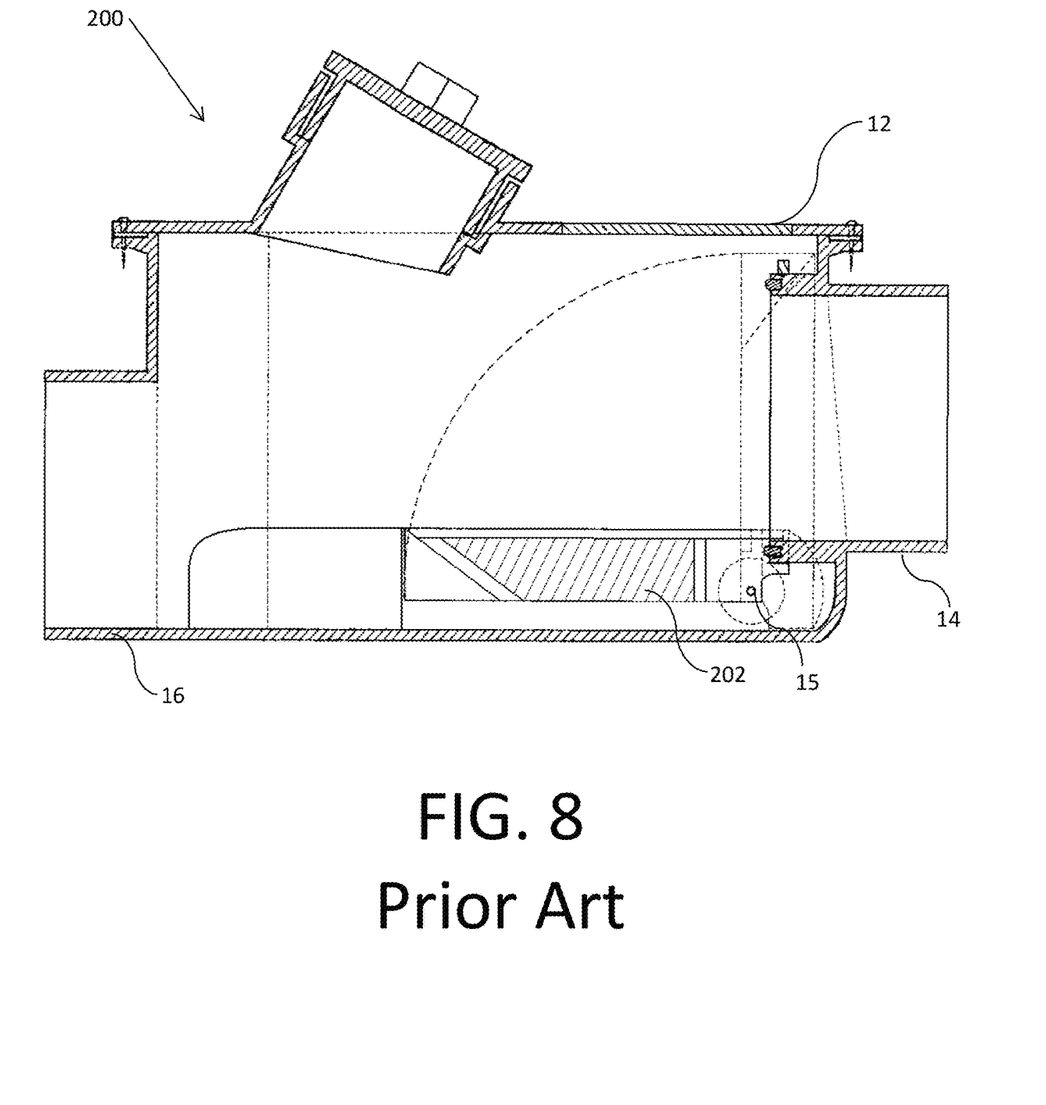
FIG. 8 is a side elevation view in section of a prior art backwater valve.
Figure 9:
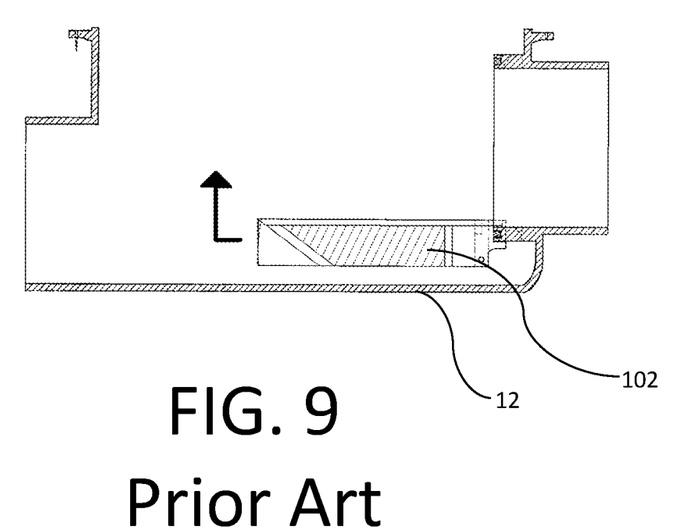
FIG. 9 is a side elevation view in section of a prior art backwater valve with the valve being removed.
Figure 10:
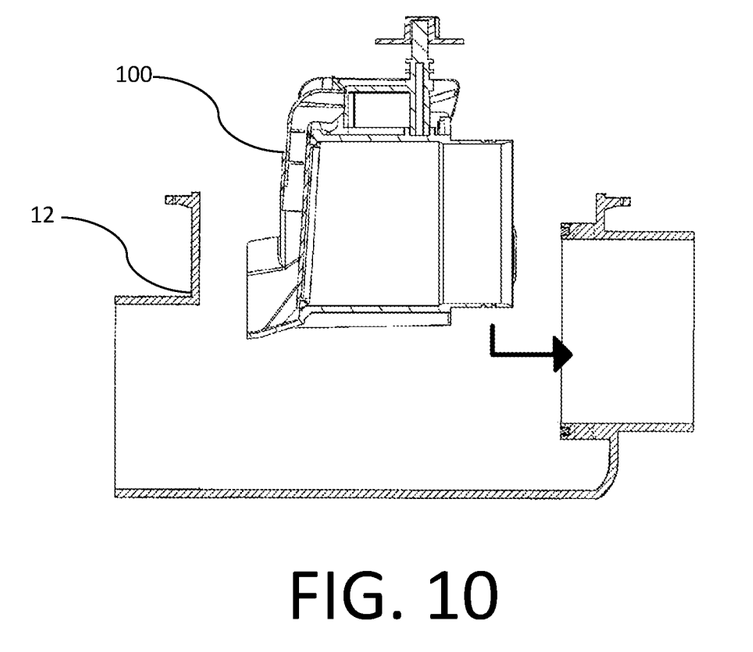
FIG. 10 is a side view in section of a backwater valve insert being retrofitted into an existing hollow valve body.

Referring to FIG. 8 through 10, an existing or prior art backwater valve 200 may be retrofitted by removing an existing valve member 202 and inserting a backwater valve insert 100. FIG. 8 depicts an example of a prior art backwater valve 200 is shown, similar to the backwater valve shown and described in U.S. Pat. No. 8,578,961 (Coscarella) entitled "Low Profile Backwater Valve". Referring to FIG. 9, existing valve member 202 is removed to provide hollow valve body 12 with inlet 14 and outlet 16 as discussed above. Referring to FIG. 10, backwater valve insert 100 is placed inside of hollow valve body 12. Existing valve assembly member 202 is shown as a normally open valve member that lies along the bottom of valve body 12 that pivots upward to the closed position in response to a backwater event, although other types of valve designs may also be retrofitted if the existing valve member may be removed before retrofitting with backwater valve insert 100. Insert 100 has an extension 102 with a first end 104 that fits within inlet 14 of hollow valve body 12, and a second end 106 opposite first end 104 and connected by a flow path 108. First end 104 is sized to be received within inlet 14 of hollow valve body 12 to seal flow path 108. Valve member 20 is carried by extension 102 and is pivotally movable about pivot axis 22 between and open position and a closed position as discussed above. The above description also applies to new constructions, where hollow valve body 12 is designed to receive backwater valve inert 100, whether hollow valve body 12 has an existing valve member 202 installed, or is designed to receive either valve member 202 or backwater valve insert 100.

Each float 32 moves along float path 132 in a vertical direction following the water level within valve body 12. Float paths 132 may be defined by a side profile of backwater valve insert 100 and an inner surface of hollow valve body 12 once insert 100 has been installed in hollow valve body 12. For example, insert 100 may have flanges that depend from insert 100 that, when installed, are adjacent to, and are designed to cooperate with, the inner surface of valve body 12 to create suitably sized and shaped float chambers that allow floats 32 to move and interact with counterweights 28. Insert 100 and valve body 12 may form one or more float chambers 130 in which floats 32 reside and move along float paths 132. The side profile of backwater valve insert 100 may include one or float guides 134 that confine floats 32 to float paths 132. Insert 100 and hollow valve body 12 may also cooperate to define one or more flow channels 136, where the one or more flow channels 136 direct a backflow of water toward float chambers 130. Referring to FIG. 7, the flow channels may be defined at least partially by flanges 138 extended up from a bottom surface 13 of valve body 12.

Backwater valve insert 100 may have a lower flange 110 below extension 102 that extends away from second end 106 and is sized to engage and conform to bottom surface 13 of hollow valve body 12. Lower flange 110 is designed to cover or overlay the bottom surface 13 of a valve to prevent water from entering below insert 100, and avoid the collection of solids or debris, while encouraging the flow of water through hollow valve body 12.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:

1. A backwater valve, comprising:
    a hollow valve body having an inlet and an outlet, the inlet having a substantially vertical face;
    a valve member pivotally mounted within the hollow valve body, the valve member pivoting along a path defined by a pivot axis disposed above the inlet, the valve member comprising an engagement surface positioned above the pivot axis, the valve member pivoting between an open position in which the valve member is away from the inlet and a closed position in which the valve member engages the substantially vertical face and closes the inlet; and
    a cam rotatably mounted above the inlet, the cam having a variable radius that increases in a circumferential direction such that, with the cam in a first rotary position, the variable radius of the cam permits the valve member to move to the closed position and the open position with the cam remaining in the first rotary position, and in a second rotary position the variable radius of the cam engages the engagement surface of the valve member to secure the valve member in the closed position, wherein, with the cam in the first rotary position and the valve member in the closed position, the valve member is disengaged from the cam, wherein the cam rotates about a vertical axis positioned behind the substantially vertical face of the inlet relative to the outlet, the cam rotating coaxially with the vertical axis such that the cam moves along a path defined by the vertical axis.

2. The backwater valve of claim 1, wherein, in the absence of water, the valve member is biased toward the open position by one or more counterweights.

3. The backwater valve of claim 2, wherein the one or more counterweights are removable.

4. The backwater valve of claim 2, further comprising one or more floats such that, in the presence of water, the one or more floats rise and engage a valve member actuator to pivot the valve member toward the closed position.

5. The backwater valve of claim 4, wherein the valve member actuator comprises the one or more counterweights.

6. The backwater valve of claim 1, further comprising:
    a water level detector that detects a water level within the hollow valve body;
    a cam actuator connected to the cam, the cam actuator selectively rotating the cam to the second rotary position; and
    a controller connected to the water level detector and the cam actuator, wherein the controller comprises instructions to cause the cam actuator to rotate the cam toward the second rotary position in response to a predetermined water level being detected by the water level detector.

7. The backwater valve of claim 1, wherein, with the valve member in the open position, the variable radius of the cam pushes the valve member toward the closed position as the cam moves from the first rotary position toward the second rotary position.

8. A method of preventing backwater flow through a pipe, the method comprising the steps of:
    connecting an inlet and an outlet of a hollow valve body of a backwater valve to the pipe, the inlet having a substantially vertical face, the backwater valve comprising:
        a valve member pivotally mounted within the hollow valve body, the valve member having a pivotal movement defined by a pivot axis disposed above the inlet, the valve member comprising an engagement surface positioned above the pivot axis, the valve member pivoting between an open position in which the valve member is away from the inlet and a closed position in which the valve member engages the substantially vertical face of the inlet to prevent fluid flow through the inlet, wherein, in the absence of water, the valve member is biased toward the open position by one or more counterweights carried by the valve member; and
        a cam rotatably mounted above the inlet, the cam having a variable radius that increases in a circumferential direction such that, with the cam in a first rotary position, the variable radius of the cam permits the valve member to move to the closed position and the open position with the cam remaining in the first rotary position, and in a second rotary position the variable radius of the cam engages the engagement surface of the valve member to secure the valve member in the closed position; and
    rotating the cam from the first rotary position to the second rotary position to secure the valve member in the closed position and prevent fluid flow between the outlet and the inlet, wherein, with the valve member in the open position, the cam pushes the valve member toward the closed position, wherein, with the cam in the first rotary position and the valve member in the closed position, the valve member is disengaged from the cam.

9. The method of claim 8, further comprising steps of:
    detecting a water level of a backwater flow in the hollow valve body; and
    upon the water level reaching a predetermined level, activating a motor to rotate the cam from the first rotary position to the second rotary position.

10. The method of claim 8, further comprising a step of modifying an operation of the backwater valve from a normally open valve to a normally closed valve by removing the one or more counterweights.

11. The method of claim 8, wherein the backwater valve further comprises one or more floats, and the floats engage a valve member actuator to move the valve member to the closed position in the presence of water.

12. The method of claim 11, wherein the valve member actuator comprises the one or more counterweights.

13. The method of claim 8, wherein the cam rotates about a vertical axis positioned behind the inlet relative to the outlet, the cam rotating coaxially with the vertical axis such that the cam moves along a path defined by the vertical axis.

14. In combination, a backwater valve and a backwater valve insert, wherein:

the backwater valve comprises a hollow valve body having an inlet and an outlet; and the backwater valve insert comprises:
- an insert body having a first end, a second end, and defining a flow path between the first end and the second end, the insert body being sized to be received within the hollow valve body such that the first end is in fluid communication with the inlet of the hollow valve body, and the second end is in fluid communication with the outlet of the hollow valve body;
- a valve member carried by the insert body, the valve member being pivotally movable about a pivot axis disposed above the flow path, the valve member pivoting between an open position in which the valve member is away from the inlet and a closed position in which the valve member engages the inlet to prevent fluid flow through the inlet;
- one or more counterweights that bias the valve member toward the open position; and
- one or more floats positioned within the hollow valve body such that in the presence of water within the hollow valve body, the one or more floats rise and engage a valve member actuator to move the valve member toward the closed position.

15. The combination of claim 14, wherein the backwater valve insert further comprises a lock that selectively locks the valve member into the closed position.

16. The combination of claim 15, wherein the lock comprises a cam mounted above the flow path that engages the valve member, and wherein, with the valve member in the open position, the cam pushes the valve member toward the closed position as the cam moves from a first rotary position toward a second rotary position.

17. The combination of claim 14, wherein the one or more counterweights are removable to convert the valve member from a normally open operation to a normally closed operation.

18. The combination of claim 14, wherein the valve member actuator comprises the one or more counterweights.

19. The combination of claim 14, wherein an inner surface of the hollow valve body of the backwater valve and an outer surface of the insert body cooperate to define one or more float chambers that receive the one or more floats, the one or more float chambers being in fluid communication with the flow path of the insert body.

20. In combination, a backwater valve comprising a hollow valve body, and a backwater valve insert, wherein:

the hollow valve body comprises:
- an inlet;
- an outlet;
- a flow path between the inlet and the outlet; and
- one or more float chambers adjacent to the inlet and in fluid communication with the flow path; and the backwater valve insert being insertable within the hollow valve body, the backwater valve insert comprising:
- one or more floats configured to be positioned within the one or more float chambers; and
- a valve member configured to be mounted adjacent to the inlet within the hollow valve body such that the valve member is pivotally movable about a pivot axis above the inlet between an open position in which the valve member is away from the inlet and a closed position in which the valve member engages the inlet to prevent fluid flow through the inlet, the valve member comprising one or more counterweights that bias the valve member toward the open position;

wherein, with the backwater valve insert inserted within the hollow valve body and in the presence of water, the one or more floats being adapted to rise into engagement with the one or more counterweights to move the valve member toward the closed position.

* * * * *